(12) United States Patent
Birch

(10) Patent No.: US 8,313,065 B2
(45) Date of Patent: Nov. 20, 2012

(54) ALLOY INSERT CLAMP

(75) Inventor: Frank J. Birch, Pawtucket, RI (US)

(73) Assignee: Mueller International, LLC, Atlanta, GA (US)

( * ) Notice: Subject to any disclaimer, the term of this patent is extended or adjusted under 35 U.S.C. 154(b) by 172 days.

(21) Appl. No.: 12/780,429

(22) Filed: May 14, 2010

(65) Prior Publication Data
US 2011/0278402 A1   Nov. 17, 2011

(51) Int. Cl.
*F16L 3/08* (2006.01)
*F16L 9/14* (2006.01)
(52) U.S. Cl. .......................... 248/74.4; 248/65; 138/149
(58) Field of Classification Search ............... 248/74.4, 248/49, 58, 62, 65, 74.1; 138/149
See application file for complete search history.

(56) References Cited

U.S. PATENT DOCUMENTS

| | | | | |
|---|---|---|---|---|
| 2,396,837 | A * | 3/1946 | Ellinwood | 174/40 CC |
| 3,606,218 | A * | 9/1971 | Enlund et al. | 248/74.2 |
| 4,530,478 | A * | 7/1985 | McClellan | 248/62 |
| 4,804,158 | A * | 2/1989 | Collins et al. | 248/74.4 |
| 4,951,714 | A * | 8/1990 | Detzel et al. | 138/149 |
| 7,467,766 | B2 * | 12/2008 | Pothanikat et al. | 248/65 |

FOREIGN PATENT DOCUMENTS

JP          2002048269 A  *  2/2002

* cited by examiner

*Primary Examiner* — Anita M King
(74) *Attorney, Agent, or Firm* — Taylor English Duma LLP

(57) ABSTRACT

A pipe support clamp, a system using the clamp, and a method of supporting a pipe with the clamp are disclosed. The pipe support clamp includes two housings, and a number of high temperature inserts, where at least one high temperature insert is coupled to the first housing and at least one high temperature insert is coupled to the second housing.

27 Claims, 3 Drawing Sheets

ALLOY INSERT CLAMP

BACKGROUND

1. Field of the Invention

The invention is directed to pipe clamps, systems, and methods. In particular, the invention is directed toward pipe clamps, systems, and methods for high temperature applications.

2. Background of the Invention

Piping systems are used throughout the world to transport materials from one point to another. Large scale piping systems can include pipes that are several feet in diameter and hundreds of miles in length, such as the Trans-Alaska Pipeline System. While small scale piping systems can have pipes that are smaller than an inch in diameter and only transport materials a few feet, such as household plumbing systems. Each type of systems has many unique features and also many features in common. For instance, many piping systems are supported.

There are a number of devices to support piping systems, including but not limited to clamps, risers, hangers, saddle supports, pipe stanchions, pipe rolls, trapeze, pipe rings, etc. Each of these devices can be used to support a pipe from the floor, a wall, or from above (e.g. a ceiling). For example, a pipe clamp is a device that surrounds a pipe and can be attached to a supporting structure. FIG. 1, shows an exemplary pipe clamp 100. Pipe clamp 100 has an upper c-shaped portion 105 and a lower c-shaped portion 110 which are held together by fastening devices 115. C-shaped portions 105 and 110 are kept at a specified distance by spacers 120. The clamps can be made out of any material, including but not limited to steel, iron, plastic, fibrous materials, and synthetic materials.

The pipes that are supported by clamps and other devices often carry materials that are in excess of 750° F. In such circumstances, the supports must be able to endure such high temperatures, or else the devices may fail. Often, certain alloy steels, such as the chrome molybdenum steels ASTM A387 Grade 22 (which has an allowable stress of 3.8 ksi at 1100° F.) or ASTM A387 Grade P91 (which has an allowable stress of 10.3 ksi at 1100° F.), are used in pipe clamps. However, alloys such as ASTM A387 Grade 22 have a significant load carrying capacity reduction at temperatures above 1000° F. and alloys such as ASTM A387 Grade P91 can be expensive and difficult to cut and machine. Thus it is desirable to have a supporting device that can support a pipe at high temperatures that is inexpensive and easily made.

SUMMARY OF THE INVENTION

The present invention overcomes the problems and disadvantages associated with current strategies and designs and provides new tools and methods of supporting an object.

One embodiment is directed to a pipe support clamp. The clamp includes a first and a second housing and a number of high temperature inserts. At least one high temperature insert is attached to an inner surface of the first housing and at least one high temperature insert is attached to an inner surface of the second housing.

In certain embodiments, there are a number of fastening devices that attached the first housing to the second housing. In certain embodiment, there is at least one spacer. The spacer is positioned between the first housing and the second housing to separate the first housing from the second housing at a predetermined distance. The high temperature inserts can be adapted to engage a shear lug or a stanchion.

In certain embodiments, the first housing and the second housing are of a one material and the high temperature inserts are of another material. The first material can be standard grade alloy and the second material is of a higher grade alloy. The higher grade alloy can be adapted to withstand temperatures in excess of 500° F. (260° C.). The higher grade alloy can be chosen from materials such as ASTM A387 Grade P91 alloy.

Another embodiment is directed to a system for supporting a pipe. The system includes the pipe and pipe supports. Each pipe support clamp can include a first and a second housing, and a number of high temperature inserts. At least one high temperature insert is attached to the inner surface of the first housing and at least one high temperature insert is coupled to the inner surface of the second housing.

In certain embodiments, each pipe support clamp includes a number of fastening devices to attach the first housing to the second housing. In certain embodiments, each pipe support clamp includes at least one spacer. The spacer is positioned between the first housing and the second housing to separate the first housing from the second housing at a predetermined distance. The pipe can have a number of shear lugs or stanchions coupled to the pipe, wherein each high temperature inserts is adapted to engage one shear lugs or stanchion.

In certain embodiments, the first housing and the second housing are of one material and the high temperature inserts are of another material. The first material can be standard grade alloy and the second material can be a higher grade alloy. The higher grade alloy can be adapted to withstand temperatures in excess of 500° F. (260° C.). The higher grade alloy can be chosen from materials such as ASTM A387 Grade P91 alloy.

Another embodiment is directed to a method of supporting a pipe. The method includes the steps of attaching at least one high temperature insert to the inner surface of a first housing, attaching at least one high temperature insert to the inner surface of a second housing, positioning the pipe between the first housing and the second housing, and attaching the first housing to the second housing so that the high temperature inserts come into contact with the outer surface of the pipe. The high temperature inserts can be adjacent to an outer surface of the pipe.

In certain embodiments, the method includes attaching the first housing to the second housing with at least one fastening device. In certain embodiments, the method includes positioning at least one spacer between the first housing and the second housing to separate the first housing from the second housing at a predetermined distance. In certain embodiments, there are a plurality of shear lugs or stanchions attached to the pipe and each high temperature inserts is adapted to engage one shear lugs or stanchion.

In certain embodiments, the first housing and the second housing are of one material and the high temperature inserts are of another material. The first material can be standard grade alloy and the second material is of a higher grade alloy. The higher grade alloy can be adapted to withstand temperatures in excess of 500° F. (260° C.). The higher grade alloy can be chosen from materials such as ASTM A387 Grade P91 alloy.

Other embodiments and advantages of the invention are set forth in part in the description, which follows, and in part, may be obvious from this description, or may be learned from the practice of the invention.

DESCRIPTION OF THE DRAWING

The invention is described in greater detail by way of example only and with reference to the attached drawing, in which.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention A problem in the art capable of being solved by the embodiments of the present invention is supporting a pipe that is subject to high temperatures. It has been surprisingly discovered that inserting an alloy spacer between a pipe clamp and the pipe increases the load capacity of the pipe clamp at high temperatures.

Figure 1:
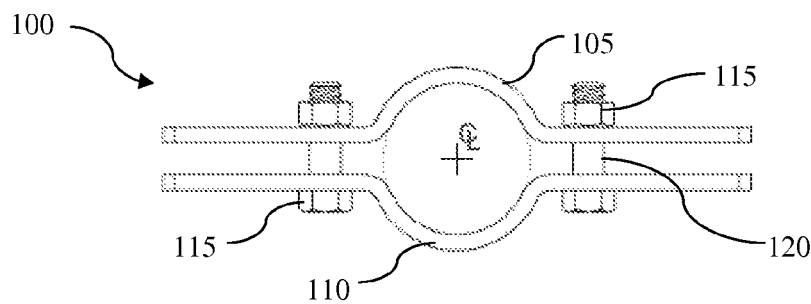
FIG. 1 shows a conventional pipe clamp.
Figure 2:
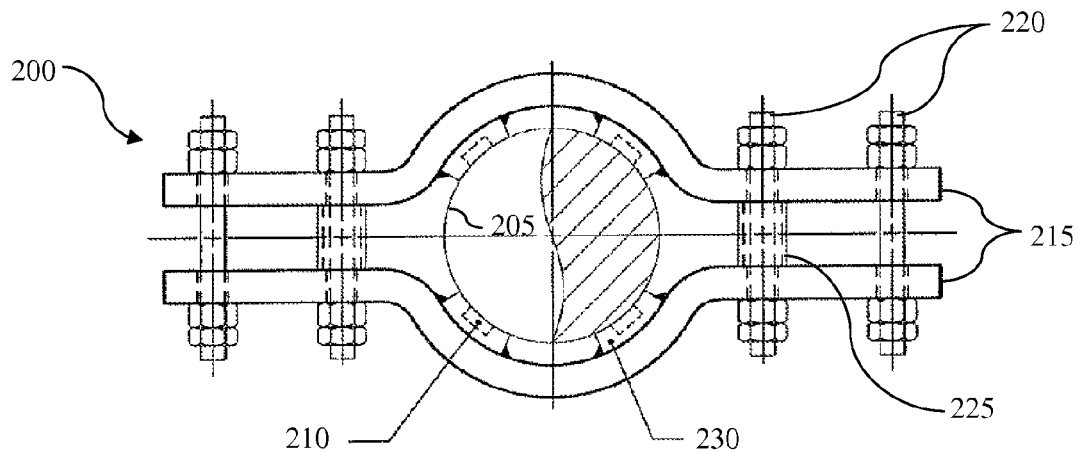
FIG. 2 shows an embodiment of a riser clamp.

FIG. 2 shows an embodiment of a of a riser clamp 200. Riser clamp 200 may support a vertical pipe 205. In certain embodiments, pipe 205 has shear lugs 210 coupled to the outer surface of the pipe body at regular intervals. In the embodiment shown in FIG. 2, four shear lugs 210 are equally spaced around pipe 205. Shear lugs 210 can be coupled to pipe 205 by welds, adhesive, or any by other method known in the art. Additionally, shear lugs 210 can be incorporated into pipe 205 during the manufacturing process of pipe 205, e.g. by molding or machining. In the preferred embodiment, shear lugs 210 are of the same material as pipe 205, however any material could be used.

In certain embodiments, riser clamp 200 has two c-shaped halves 215. C-shaped halves 215 can be made of any material know in the art, including but not limited to metal, plastic, resin, synthetic materials, and fibers. C-shaped halves 215 can be coupled together by fastening devices 220. While four fastening devices 220 are shown, any number of fastening devices can be used. Fastening devices can be bolts, clips, rivets, snaps, adhesive, welds, or any other device know in the art. In certain embodiments spacers 225 are positioned between the two c-shaped halves 215. Spacers 225 can be of any material, including but not limited to, fiber, plastic, metal, asbestos, synthetic materials, and resin, or combinations thereof. In the preferred embodiment, spacers 225 are positioned over fastening devices 220. Spacers 225 keep the two c-shaped halves 215 at a predetermined separation.

At least one high temperature insert 230 is coupled to each c-shaped half 215. High temperature inserts 230 can be coupled to c-shaped halves 215 by any method know in the art including but not limited to welding, adhesive, and bolting. In the embodiments where welding is used, it is well known in the art that different materials require different welding techniques. In the preferred embodiment, high temperature inserts 230 are made of alloys of steel that are able to withstand (e.g. without melting, cracking, oxidizing, combusting, or otherwise substantially altering in physical or chemical form) temperatures above at least 500° F., 750° F., or 1000° F. High temperature inserts 230 can be made by any method known in the art, including but not limited to growing, molding, and machining. In the preferred embodiments, high temperature inserts 230 are made of high grade alloys such as ASTM A387 Grade P91. Preferably, c-shaped halves 215 are made of a standard grade material, such as ASTM A387 Grade 22 or ASTM A36, while high temperature inserts 230 are made of the high grade alloys. While high temperature inserts 230 are shown as substantially rectangular in cross sectional shape, high temperature inserts 230 can have any shape, including but not limited to circular, ovoid, square, spiral, trapezoidal, and triangular. Additionally, high temperature inserts 230 can be arranged in any way, for example, symmetrically, at diametrically opposed positions, staggered, off set, asymmetrically, and evenly spaced.

High temperature inserts 230 are positioned on c-shaped halves 215 so that high temperature inserts 230 engage shear lugs 210 upon assembly of riser clamp 200. For example, inserts 230 can have cavities into which shear lugs 210 fit. While high temperature inserts 230 can cover any portion of the inner surface of c-shaped halves 215, preferably high temperature inserts 230 are spaced at regular intervals around the inner surface of c-shaped halves 215. High temperature inserts 230 reduce the temperature experienced by c-shaped halves 215. For example, it has been determined that for each inch between the outer surface of pipe 205 and the inner surface of c-shaped halves 215 there is a 100° F. temperature drop. High temperature inserts 230 can keep the outer surface of pipe 205 and the inner surface of c-shaped halves 215 separated at any distance. However in the preferred embodiment, high temperature inserts 230 provide two inches of space between the outer surface of pipe 205 and the inner surface of c-shaped halves 215. Two inches of space can increase the capacity of a clamp by a factor of three. In certain embodiments, the empty space between pipe 205 and c-shaped halves 215 is filled with an insulating material. Any insulating material can be used, including but not limited to fiberglass, synthetic polymers, cellulose, mineral wool and asbestos.

Figure 3A:
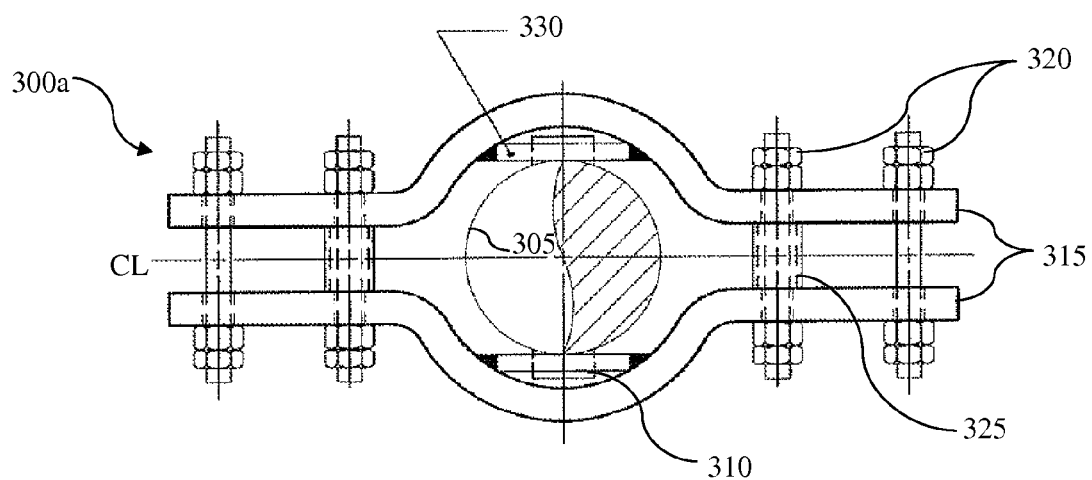
FIG. 3a shows a second embodiment of a riser clamp.
Figure 3B:
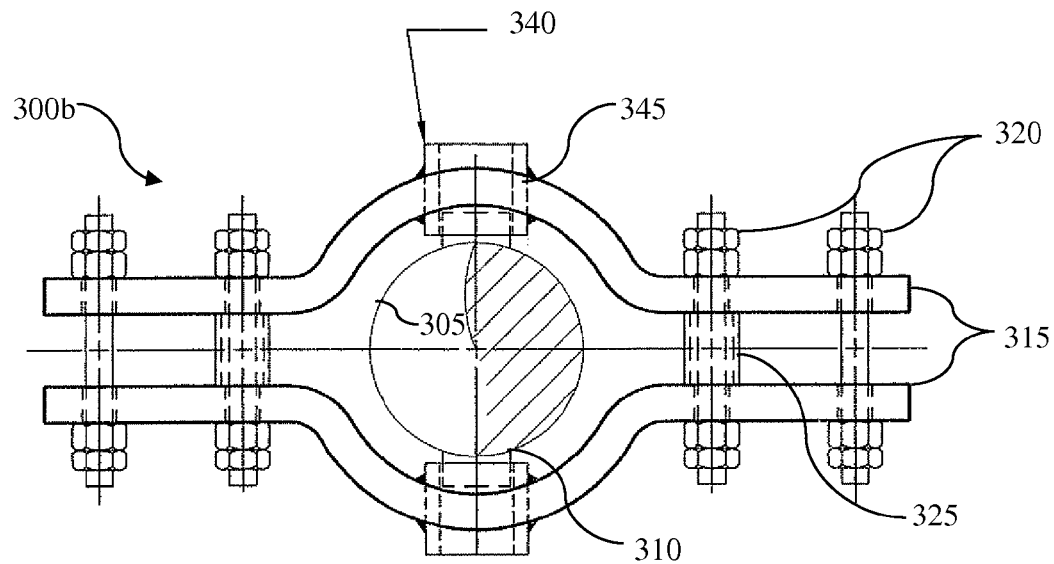
FIG. 3b shows a second embodiment of a riser clamp.

FIGS. 3a and 3b show two other embodiments of a riser clamp 300a and 300b. Riser clamps 300a and 300b can support a vertical pipe 305. In riser clamps 300a and 300b, stanchions 310 are coupled to the outer surface of pipe 305. Stanchions 310 can be tube stubs, pipe stubs, round bars or posts to provided support. Stanchions 310 can be coupled by any method known in the art, including but not limited to welds and adhesive. Additionally, stanchions 310 can be incorporated into pipe 305 during the manufacturing process of pipe 305, e.g. by molding or machining. In the preferred embodiment, stanchions 310 are of the same material as pipe 305, however another material could be used. As shown in FIGS. 3a and 3b, two stanchions 310 are shown at diametrically opposed positions on pipe 305 to permit the pipe to rotate in the clamp.

Similarly to the embodiment shown in FIG. 2, riser clamps 300a and 300b can include c-shaped halves 315, fastening devices 320, and spacers 325. However, riser clamp 300a has two high temperature inserts 330, while the inserts in riser clamp 300b are two high temperature sleeves 340. High temperature inserts 330 and high temperature sleeves 340 can be coupled to c-shaped halves 315 by any method know in the art including but not limited to welding, adhesive, and bolting. In the embodiments where welding is used, it is well known in the art that different materials require different welding techniques. In the preferred embodiment, high temperature inserts 330 and high temperature sleeves 340 are made of alloys of steel that are able to withstand (e.g. without melting, cracking, oxidizing, combusting, or otherwise substantially altering in physical or chemical form) temperatures above at least 500° F., 750° F., 1000° F. High temperature inserts 330 and high temperature sleeves 340 can be made by any method known in the art, including but not limited to growing, molding, and machining. In the preferred embodiments, high temperature inserts 330 and high temperature sleeves 340 are made of high grade alloys such as ASTM A387 Grade P91 alloys. Preferably, c-shaped halves 315 are made of a standard grade material, such as ASTM A387 Grade 22 or ASTM A36, while high temperature inserts 330 and high temperature sleeves 340 are made of the high grade alloys.

Referring to FIG. 3a, high temperature inserts 330 are positioned on c-shaped halves 315 so that high temperature inserts 330 engage stanchions 310 upon assembly of riser clamp 300a. For example, each high temperature inserts 330 can have a hole through which a stanchion 310 fits. While high temperature inserts 330 can cover any portion of the inner surface of c-shaped halves 315, preferably high temperature inserts 330 are attached at two points along the inner surface of c-shaped halves 315 such that high temperature inserts 330 are parallel to the center line CL of riser clamp 300a. More preferably, high temperature inserts 330 are positioned such that there is a gap between the inner surface of c-shape halves 315 and a surface of high temperature inserts 330. In certain embodiments, the empty space between pipe 305 and c-shaped halves 315 is filled with an insulating material. Any insulating material can be used, including but not limited to fiberglass, synthetic polymers, cellulose, mineral wool and asbestos.

Referring to FIG. 3b, c-shaped halves 315 have bore holes 345 through which high temperature sleeves 340 can fit. Preferably, bore holes 345 are created prior to installation of riser clamp 300b and, more preferably, bore holes 345 are created during fabrication of c-shaped halves 315. In the preferred embodiment, high temperature sleeves 340 are hollow pipes or tubes fitted into bore holes 345 and are welded to c-shaped halves 315. However, high temperature sleeves 340 can be coupled to c-shaped halves 315 by other methods, including but not limited to, adhesive, friction fitting, and screw threading. In the preferred embodiment, the inner diameter of high temperature sleeves 340 is slightly larger than the outer diameter of stanchions 310. Preferably, stanchions 310 fit securely within high temperature sleeves 340.

Figure 4:
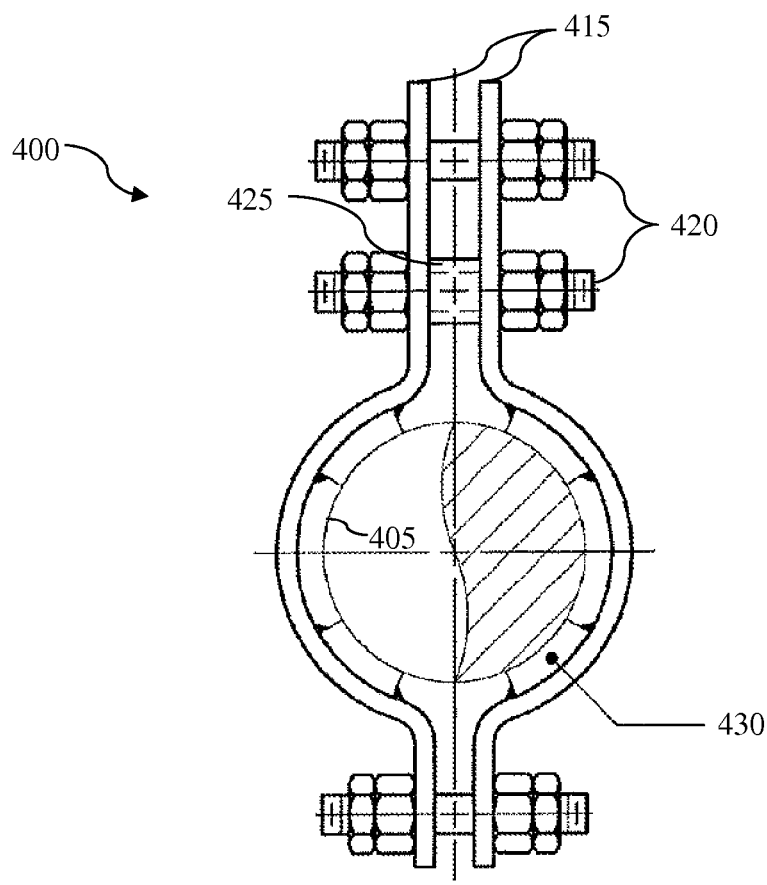
FIG. 4 shows an embodiment of a 3-bolt clamp.

FIG. 4 shows an embodiment of a 3-bolt clamp 400. 3-bolt clamp 400 can be used to support a horizontal pipe 405. Unlike the embodiments show in FIGS. 2 and 4, there are no lugs or stanchions coupled to pipe 405. Since pipe 405 is horizontal, pipe 405 can be supported by resting pipe 405 on a support structure, for example 3-bolt clamp 400. Similarly to the embodiments shown in FIGS. 2 and 3, 3-bolt clamp 400 can include c-shaped halves 415, fastening devices 420, and spacers 425.

3-bolt clamp 400 employs high temperature inserts 430 to secure and support pipe 405. In the preferred embodiment, high temperature inserts 430 are coupled to c-shaped clamps 415. High temperature inserts 430 can be coupled to c-shaped halves 415 by any method know in the art including but not limited to compressive force, welding, adhesive, and bolting. In the embodiments where welding is used, it is well known in the art that different materials require different welding techniques. In the preferred embodiment, high temperature inserts 430 are made of alloys of steel that are able to withstand (e.g. without melting, cracking, oxidizing, combusting, or otherwise substantially altering in physical or chemical form) temperatures above at least 500° F., 750° F., or 1000° F. High temperature inserts 430 can be made by any method known in the art, including but not limited to growing, molding, and machining. In the preferred embodiments, high temperature inserts 430 are made of high grade alloys such as ASTM A387 Grade P91 alloys. Preferably, c-shaped halves 415 are made of a standard grade material, such as ASTM A387 Grade 22 or ASTM A36, while high temperature inserts 430 are made of the high grade alloys.

While high temperature inserts 430 can cover any portion of the inner surface of c-shaped halves 415, preferably high temperature inserts 430 are spaced at regular intervals around the inner surface of c-shaped halves 415. In certain embodiments, the empty space between pipe 405 and c-shaped halves 415 is filled with an insulating material. Any insulating material can be used, including but not limited to fiberglass, synthetic polymers, cellulose, mineral wool and asbestos.

Figure 5:
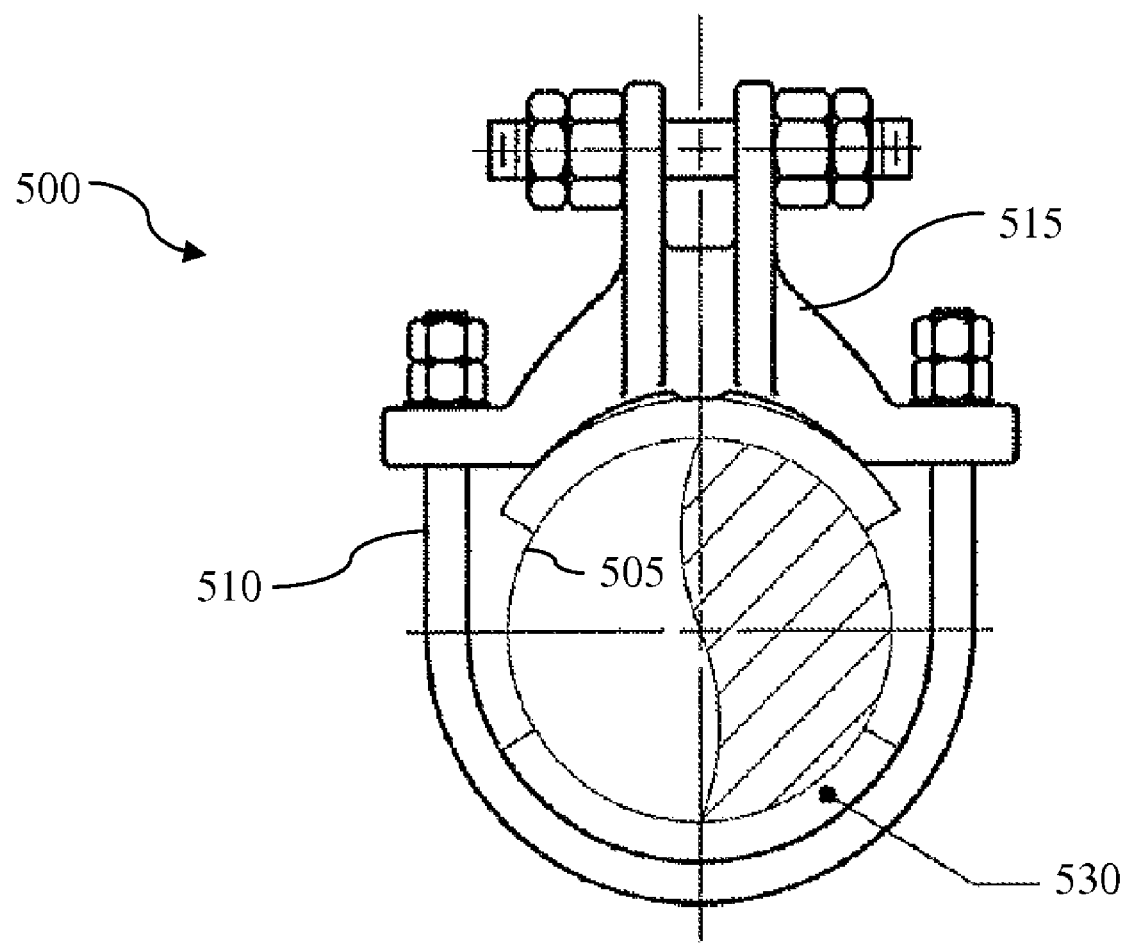
FIG. 5 shows an embodiment of a yoke clamp.

FIG. 5 shows an embodiment of a yoke clamp 500. Yoke clamp 500 can be used to support a horizontal pipe 505. Yoke clamp 500 can include u-shaped member 510 coupled to support bracket 515. U-shaped member 510 and support bracket 515 may be coupled by any method known in the art, including but not limited to bolts, snaps, cotter pins, adhesive, and welding. Since pipe 505 is horizontal, pipe 505 can be supported by resting pipe 505 on a support structure, for example u-shaped member 510. Yoke clamp 500 employs high temperature inserts 530 to secure and support pipe 505. In the preferred embodiment, at least one high temperature insert 530 is coupled to u-shaped member 510, and at least one high temperature insert 530 is coupled to support bracket 515. High temperature inserts 530 can be coupled to u-shaped member 410 and support bracket 515 by any method know in the art including but not limited to compressive force, welding, adhesive, and bolting. In the embodiments where welding is used, it is well known in the art that different materials require different welding techniques. In the preferred embodiment, high temperature inserts 530 are made of alloys of steel that are able to withstand (e.g. without melting, cracking, oxidizing, combusting, or otherwise substantially altering in physical or chemical form) temperatures above at 500° F., 750° F., 1000° F. High temperature inserts 530 can be made by any method known in the art, including but not limited to growing, molding, and machining. In the preferred embodiments, high temperature inserts 530 are made of high grade alloys such as ASTM A387 Grade P91 alloys. Preferably, u-shaped member 510 is made from a 300 series stainless steel and support bracket 515 is made of a standard grade material, such as ASTM A387 Grade 22, while high temperature inserts 530 are made of the high grade alloys.

While high temperature inserts 530 can cover any portion of the inner surface of u-shaped member 510 and support bracket 515, preferably high temperature inserts 530 only cover a portion of u-shaped member 510 and support bracket 515. In certain embodiments, the empty space between pipe 505, u-shaped remember 510, and support bracket 515 is filled with an insulating material. Any insulating material can be used, including but not limited to fiberglass, synthetic polymers, cellulose, mineral wool and asbestos.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:
1. A pipe support clamp, comprising:
a first housing adapted to surround a portion of a pipe;

a second housing adapted to surround a portion of the pipe, wherein the second housing is coupled to the first housing; and a plurality of high temperature inserts, wherein at least one high temperature insert is coupled to an inner surface of the first housing, at least one high temperature insert is coupled to an inner surface of the second housing, and the high temperature inserts are evenly spaced around the inner surfaces of the first housing and the second housing, wherein each of the plurality of high temperature inserts is adapted to engage a shear lug.

2. The pipe support clamp of claim 1, further comprising a plurality of fastening devices to couple the first housing to the second housing.

3. The pipe support clamp of claim 1, further comprising at least one spacer, wherein the spacer is positioned between the first housing and the second housing to separate the first housing from the second housing at a predetermined distance.

4. A pipe support clamp, comprising:
a first housing adapted to surround a portion of a pipe;
a second housing adapted to surround a portion of the pipe, wherein the second housing is coupled to the first housing; and
a plurality of high temperature inserts, wherein at least one high temperature insert is coupled to an inner surface of the first housing, at least one high temperature insert is coupled to an inner surface of the second housing, the high temperature inserts are evenly spaced around the inner surfaces of the first housing and the second housing,
wherein each of the plurality of high temperature inserts is adapted to engage a stanchion.

5. The pipe support clamp of claim 4, further comprising a plurality of fastening devices to couple the first housing to the second housing.

6. The pipe support clamp of claim 4, further comprising at least one spacer, wherein the spacer is positioned between the first housing and the second housing to separate the first housing from the second housing at a predetermined distance.

7. A pipe support clamp, comprising:
a first housing adapted to surround a portion of a pipe;
a second housing adapted to surround a portion of the pipe, wherein the second housing is coupled to the first housing; and
a plurality of high temperature inserts, wherein at least one high temperature insert is coupled to an inner surface of the first housing, at least one high temperature insert is coupled to an inner surface of the second housing, the high temperature inserts are evenly spaced around the inner surfaces of the first housing and the second housing,
wherein the first housing and the second housing are of a standard grade alloy and the plurality of high temperature inserts are of a higher grade alloy.

8. The pipe support clamp of claim 7, wherein the higher grade alloy is adapted to withstand temperatures in excess of 500° F. (260° C.).

9. The pipe support clamp of claim 8, wherein the higher grade alloy is chosen from the group consisting of ASTM A387 Grade 22 alloy and ASTM A387 Grade P91 alloy.

10. A system for supporting a pipe, comprising:
a pipe;
at least one pipe support clamp supporting the pipe, wherein each pipe support clamp includes:
a first housing adapted to surround a portion of the pipe;
a second housing adapted to surround a portion of the pipe, wherein the second housing is coupled to the first housing; and
a plurality of high temperature inserts, wherein at least one high temperature insert is coupled to an inner surface of the first housing, at least one high temperature insert is coupled to an inner surface of the second housing, and the high temperature inserts are evenly spaced around the inner surfaces of the first housing and the second housing; and
a plurality of shear lugs coupled to the pipe,
wherein each high temperature insert is adapted to engage a shear lug.

11. The system of claim 10, wherein each pipe support clamp further comprises a plurality of fastening devices to couple the first housing to the second housing.

12. The system of claim 10, wherein each pipe support clamp further comprises at least one spacer, wherein the spacer is positioned between the first housing and the second housing to separate the first housing from the second housing at a predetermined distance.

13. A system for supporting a pipe, comprising:
a pipe;
at least one pipe support clamp supporting the pipe, wherein each pipe support clamp includes:
a first housing adapted to surround a portion of the pipe;
a second housing adapted to surround a portion of the pipe, wherein the second housing is coupled to the first housing; and
a plurality of high temperature inserts, wherein at least one high temperature insert is coupled to an inner surface of the first housing, at least one high temperature insert is coupled to an inner surface of the second housing, and the high temperature inserts are evenly spaced around the inner surfaces of the first housing and the second housing; and
a plurality of stanchions,
wherein each high temperature insert is adapted to engage a stanchion.

14. The system of claim 13, wherein each pipe support clamp further comprises a plurality of fastening devices to couple the first housing to the second housing.

15. The system of claim 13, wherein each pipe support clamp further comprises at least one spacer, wherein the spacer is positioned between the first housing and the second housing to separate the first housing from the second housing at a predetermined distance.

16. A system for supporting a pipe, comprising:
a pipe; and
at least one pipe support clamp supporting the pipe, wherein each pipe support clamp includes:
a first housing adapted to surround a portion of the pipe;
a second housing adapted to surround a portion of the pipe, wherein the second housing is coupled to the first housing; and
a plurality of high temperature inserts, wherein at least one high temperature insert is coupled to an inner surface of the first housing, at least one high temperature insert is coupled to an inner surface of the second housing, and the high temperature inserts are evenly spaced around the inner surfaces of the first housing and the second housing;
wherein the first housing and the second housing are of a standard grade alloy and the plurality of high temperature inserts are of a higher grade alloy.

17. The system of claim 16, wherein the higher grade alloy is adapted to withstand temperatures in excess of 500° F. (260° C.).

18. The system of claim 17, wherein the higher grade alloy is chosen from the group consisting of ASTM A387 Grade P91 alloy.

19. A method of supporting a pipe, comprising:
coupling at least one high temperature insert to an inner surface of a first housing;
coupling at least one high temperature insert to an inner surface of a second housing;
positioning the pipe between the first housing and the second housing, wherein the high temperature inserts are adjacent to an outer surface of the pipe; and
coupling the first housing to the second housing so that the high temperature inserts come into contact with the outer surface of the pipe, wherein the high temperature inserts are evenly spaced around the outer surface of the pipe;
wherein there are a plurality of shear lugs coupled to the pipe and each high temperature insert is adapted to engage one shear lug.

20. The method of claim 19, further comprising coupling the first housing to the second housing with at least one fastening device.

21. The method of claim 19, further comprising positioning at least one spacer between the first housing and the second housing to separate the first housing from the second housing at a predetermined distance.

22. A method of supporting a pipe, comprising:
coupling at least one high temperature insert to an inner surface of a first housing;
coupling at least one high temperature insert to an inner surface of a second housing;
positioning the pipe between the first housing and the second housing, wherein the high temperature inserts are adjacent to an outer surface of the pipe; and
coupling the first housing to the second housing so that the high temperature inserts come into contact with the outer surface of the pipe, wherein the high temperature inserts are evenly spaced around the outer surface of the pipe;
wherein there are a plurality of stanchions and each high temperature insert is adapted to engage a stanchion.

23. The method of claim 22, further comprising coupling the first housing to the second housing with at least one fastening device.

24. The method of claim 22, further comprising coupling the first housing to the second housing with at least one fastening device.

25. A method of supporting a pipe, comprising:
coupling at least one high temperature insert to an inner surface of a first housing;
coupling at least one high temperature insert to an inner surface of a second housing;
positioning the pipe between the first housing and the second housing, wherein the high temperature inserts are adjacent to an outer surface of the pipe; and
coupling the first housing to the second housing so that the high temperature inserts come into contact with the outer surface of the pipe,
wherein the high temperature inserts are evenly spaced around the outer surface of the pipe, and
wherein the first housing and the second housing are of a standard grade alloy and the plurality of high temperature inserts are of a higher grade alloy.

26. The method of claim 25, wherein the higher grade alloy is adapted to withstand temperatures in excess of 500° F. (260° C.).

27. The method of claim 26, wherein the higher grade alloy is chosen from the group consisting of ASTM A387 Grade P91 alloy.

* * * * *